(12) United States Patent
Chiu et al.

(10) Patent No.: US 7,904,455 B2
(45) Date of Patent: Mar. 8, 2011

(54) CASCADING CLUSTER COLLAGES: VISUALIZATION OF IMAGE SEARCH RESULTS ON SMALL DISPLAYS

(75) Inventors: Patrick Chiu, Menlo Park, CA (US); Bee Yian Liew, Cupertino, CA (US); Andreas Girgensohn, Palo Alto, CA (US); Martin van den Berg, Palo Alto, CA (US); Giovanni Lorenzo Thione, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 763 days.

(21) Appl. No.: 11/405,316

(22) Filed: Apr. 17, 2006

(65) Prior Publication Data

US 2007/0098266 A1  May 3, 2007

Related U.S. Application Data

(60) Provisional application No. 60/733,438, filed on Nov. 3, 2005.

(51) Int. Cl.
*G06F 17/30* (2006.01)

(52) U.S. Cl. ............... 707/737; 707/E17.004; 382/224

(58) Field of Classification Search ........... 707/1, 737, 707/E17.004; 382/224
See application file for complete search history.

(56) References Cited

U.S. PATENT DOCUMENTS

| | | | |
|---|---|---|---|
| 5,537,491 A | 7/1996 | Mahoney | |
| 5,553,207 A | 9/1996 | Sekiguchi | |
| 5,742,294 A | 4/1998 | Watanabe | |
| 5,761,338 A | 6/1998 | Kasamatsu | |
| 5,831,747 A * | 11/1998 | Salgado | 358/453 |
| 6,081,615 A | 6/2000 | Yasui | |
| 6,275,614 B1 | 8/2001 | Krishnamurthy | |
| 6,430,312 B1 | 8/2002 | Huang | |
| 6,542,637 B1 | 4/2003 | Kita | |
| 6,562,077 B2 | 5/2003 | Bobrow | |
| 6,584,221 B1 | 6/2003 | Moghaddam | |
| 6,819,795 B1 | 11/2004 | Chiu | |
| 6,922,485 B2 | 7/2005 | Hirata | |
| 6,965,706 B2 | 11/2005 | Qian | |
| 6,999,069 B1 | 2/2006 | Watanabe | |
| 7,035,435 B2 | 4/2006 | Li | |
| 7,043,094 B2 * | 5/2006 | Thomas et al. | 382/305 |
| 7,085,401 B2 | 8/2006 | Averbuch | |
| 7,110,007 B2 | 9/2006 | Odagawa | |
| 7,263,220 B2 | 8/2007 | Crandall | |
| 2001/0020981 A1 | 9/2001 | Jun | |
| 2002/0076100 A1 | 6/2002 | Luo | |
| 2002/0107892 A1 * | 8/2002 | Chittu et al. | 707/514 |
| 2002/0126143 A1 | 9/2002 | Bae | |

(Continued)

OTHER PUBLICATIONS

Andreas Girgensohn and Patrick Chiu, Stained Glass Photo Collages, Oct. 24-27, 2004.*

(Continued)

*Primary Examiner* — James Trujillo
*Assistant Examiner* — Amresh Singh
(74) *Attorney, Agent, or Firm* — Fliesler Meyer LLP

(57) ABSTRACT

The present invention relates to a method to make effective use of display space. In an embodiment of the invention, given a heterogeneous set of images along with metadata or nearby text, similar images are recursively clustered into a k-tree using the k-means algorithm. In an embodiment of the invention, the invention is particularly useful for showing image search results on small mobile devices.

20 Claims, 12 Drawing Sheets

U.S. PATENT DOCUMENTS

| | | |
|---|---|---|
| 2003/0108237 A1 | 6/2003 | Hirata |
| 2003/0110181 A1* | 6/2003 | Schuetze et al. .......... 707/103 R |
| 2005/0084154 A1 | 4/2005 | Li |
| 2006/0015495 A1 | 1/2006 | Keating |

OTHER PUBLICATIONS

Boreczky, J., et al., "An interactive comic book presentation for exploring video," *Proc. CHI '00*, ACM Press, pp. 185-192 (2000).

Cai, D., et al., "Hierarchical clustering of WWW image search results using visual, textual and link analysis," *Proc. of ACM Multimedia '04*, pp. 952-959 (2004).

"Cascading Style Sheets," http://www.w3.org/Style/CSS.

Chen, F., et al., "Multi-modal browsing of images in web documents," *Proc. of SPIE Document Recognition and Retrieval VI* (1999).

Chiu, P., et al. (2004), "Stained-Glass Visualization for Highly Condensed Video Summaries," *Proc. IEEE Intl. Conf. on Multimedia and Expo (ICME '04)*.

"Clusty Image Search," http://clusty.com.

Girgensohn and Chiu, "Stained Glass Photo Collages," *UIST '04 Poster*, pp. 13-14 (2004).

Chiu, P. Girgensohn, A., Liu, Q. (2004). FXPAL-IP-04-006B: Determining Regions of Interest in Synthetic Images.

"Google Image Search," http://images.google.com.

Grokker—Enterprise Search Management and Content Integration, http://www.grokker.com.

Ide and Veronis (1998), "The Word Sense Disambiguation: The State of the Art," *Computational Linguistics*, 24(1), 1-40.

Kerne, A. "*CollageMachine: A Model of 'Interface Ecology*,'" NYU Ph.D. Dissertation (2001).

Li, et al. (2004), "Intuitive and Effective Interfaces for WWW Image Search Engines", *ACM Multimedia '04 Demo*.

Ma and Zhang, "Contrast-Based Image Attention Analysis by Using Fuzzy Growing," *Proc. of ACM Multimedia '03*, pp. 374-381.

MSN Search. http://search.msn.com.

Mukherjea, et al. (1998), "Using Clustering and Visualization for Refining the Results of a WWW Image Search Engine", *Proc. 1998 Workshop on New paradigms in Information Visualization and Manipulation*, ACM Press, pp. 29-35.

Suh, et al. (2003), "Automatic Thumbnail Cropping and Its Effectiveness," *Proceedings of UIST '03*, pp. 95-104.

Wang, et al. (2004), "Multi-Model Similarity Propagation and Its Application for Web Image Retrieval," *Proc. of ACM Multimedia '04*, pp. 944-951.

Wang, et al. (2004), "Grouping Web Image Search Result," *ACM Multimedia '04 Poster* (Oct. 10-16, 2004), pp. 436-439.

Wang, et al. (2003), MobiPicture—Browsing Pictures on Mobile Devices, *ACM Multimedia '04 Demo* (Nov. 2-8, 2003), p. 106-107).

About WordNet, http://wordnet.princeton.edu.

Christel, M., et al., "Multimedia Abstractions for a Digital Video Library," Proceedings of ACM Digital Libraries '97 International Conference, pp. 21-29, Jul. 1997.

Elliott, E.L., "Watch-Grab-Arrange-See: Thinking with Motion Images via Streams and Collages," MIT MS Visual Studies Thesis, Feb. 1993.

Peyrard, N., et al., "Motion-Based Selection of Relevant Video Segments for Video Summarisation," Proc. Intl. Conf. on Multimedia and Expo (ICME 2003), pp. 409-412, 2003.

Uchihashi, S., et al., "Video *Manga*: Generating Semantically Meaningful Video Summaries," Proceedings ACM Multimedia '99, pp. 383-392, Oct. 1999.

Yeung, M., et al., "Video Visualization for Compact Presentation and Fast Browsing of Pictorial Content," IEEE Transactions on Circuits and Systems for Video Technology, vol. 7, No. 5, pp. 771-785, Oct. 1997.

Huang, J., et al., "Image Indexing Using Color Correlograms," in IEEE Conference on Computer Vision and Pattern Recognition, pp. 762-768, 1997.

Smith, J.R., et al., "Local Color and Texture Extraction and Spatial Query," in IEEE International Conference on Image Processing, vol. 3, pp. 1011-1014, Sep. 16-19, 1996.

Manjunath, B.S., et al., "Color and Texture Descriptors," IEEE Transactions on Circuits and Systems for Video Technology, vol. 11, No. 6, Jun. 2001, pp. 703-715.

* cited by examiner

CASCADING CLUSTER COLLAGES: VISUALIZATION OF IMAGE SEARCH RESULTS ON SMALL DISPLAYS

PRIORITY CLAIM

This application claims priority under 35 U.S.C. 119(e) to U.S. Provisional Application No. 60/733,438 entitled "Cascading Cluster Collages: Visualization of Image Search Results on Small Displays" by Patrick Chiu et al., filed Nov. 3, 2005, which is incorporated herein by reference.

CROSS REFERENCES TO RELATED APPLICATION

This application is related to the following applications:

1) application Ser. No. 10/815,389 entitled "Extracting Video Regions of Interest" by Patrick Chiu, et al., filed Mar. 31, 2004;

(2) application Ser. No. 10/815,354 entitled "Generating a highly Condensed Visual Summary" by Patrick Chiu, et al., filed Mar. 31, 2004;

(3) application Ser. No. 10/948,730 entitled "Determining Regions of Interest in Photographs and Images" by Patrick Chiu, et al., filed Sep. 23, 2004; and (4) application Ser. No. 10/948,823 entitled "Determining Regions of Interest in Photographs and Images" by Patrick Chiu, et al., filed Sep. 23, 2004.

FIELD OF THE INVENTION

The present invention relates to a method to make effective use of display space for showing image search results on small mobile devices using the k-means algorithm.

BACKGROUND OF INVENTION

Data clustering algorithms can be hierarchical or partitional. With hierarchical algorithms, successive clusters are found using previously established clusters, whereas partitional algorithms determine all clusters in one go. Hierarchical algorithms can be agglomerative (bottom-up) or divisive (top-down). Agglomerative algorithms begin with each element as a separate cluster and merge them in successively larger clusters. The divisive algorithms begin with the whole set and proceed to divide it into successively smaller clusters.

DESCRIPTION OF THE PRIOR ART

Web Image Search Engines

Popular search engines such as Google™ (Google Image Search, http://images.google.com, last visited Oct. 12, 2005), Google™ PDA (Google Image Search, http://www.google.com/pda, last visited Oct. 12, 2005) and MSN™ (MSN Search, http://search.msn.com, last visited Oct. 12, 2005) support image search. The search results are given in a series of Web pages with each page showing a fixed number of thumbnails in a table, for example, Google™ PDA for image search displays the retrieved images in a list, three per page. On a desktop PC display, the large amount of empty space is not a problem, but it is inefficient on a small PDA or cell phone display. MSN™ allows the images to be organized by color or black & white, and size (small, medium, large).

Clusty™ (Clusty Image Search, http://clusty.com, last visited Oct. 12, 2005) supports image search and clusters images using the simple image properties of size, name, type of file and Uniform Resource Locator (URL). The tree widget with category labels, is similar to Microsoft Windows™ File Explorer, and allows the user to navigate through the clusters. Displayed next to the tree widget is a large pane showing the thumbnail images. However, the user is not able to navigate directly with respect to the images (e.g., by clicking on the desirable image or its cluster to obtain images that are more similar).

Image Search Browsing

Microsoft™ Research 'MobiPicture' crops a set of images to a specific rectangular thumbnail size with respect to automatically detected 'Regions Of Interest' (ROI) within the images, and these thumbnails are tiled on a small display (see Wang, M., Xie, X., Ma, W., Zhang, H. (2003), "MobiPicture—Browsing Pictures on Mobile Devices", *ACM Multimedia '04 Demo*).

Microsoft™ Research has developed several techniques for clustering images on the Web. Cai et al. (Cai, D., He, X., Li, Z., Ma, W., and Wen, J. (2004), "Hierarchical clustering of WWW image search results using visual, textual and link analysis", *Proc. of ACM Multimedia '04*, pp. 952-959) proposes a clustering method using visual, textual and link analysis. The drawback to this approach is that the number of clusters is not a parameter that can be specified by the user interface module or by the user. Furthermore, the program has a post-processing step that performs clustering within clusters using low-level image features at the end of the routine to refine the clustering. In the user interface, the program presents clusters as 4-image thumbnails in one panel and presents the selected cluster's images in a second panel. Finally, the program does not completely solve the problem of directly navigating between the images.

Wang et al. (Wang, X., Ma, W., Xue, G. and Li, X. (2004) "Multi-model similarity propagation and its application for Web image retrieval", *Proc. of ACM Multimedia '04*, pp. 944-951) use an image's surrounding text in a Web page and link analysis to iteratively reinforce similarity measurements. Further, Wang et al. (Wang, X., Ma, W., He, Q., and Li, X. (2004) "Clustering Web image search result", *ACM Multimedia '04 Poster presentation*) assume as a starting point that the images returned by the search engine have the same semantic content, and proceeds to segment the image into regions and assigns code words to them to facilitate clustering. In practice, the semantic content of search results can be highly varied. In addition, the 'Multi-model similarity propagation' program does not categorize the images before clustering.

'Amore' enables users to interactively organize Web-based image search results by clustering text and image properties (see Mukherjea, S., Hirata, K., Hara, Y. (1998) "Using clustering and visualization for refining the results of a WWW image search engine", *Proc. 1998 Workshop on New paradigms in Information Visualization and Manipulation*, ACM Press, pp. 29-35). 'Amore' organizes clusters based on text and image properties (color and composition). Users can select clusters through templates representing primitive shapes.

The PARC 'multi-modal image browser' allows the user to interactively clusters images from a search query using image and textual features, and the user can narrow down the results and re-cluster based on their features (see Chen, F., Gargi, U., Niles, L., Schuetze, H. (1999), "Multi-modal browsing of images in web documents", *Proc. of SPIE Document Recognition and Retrieval VI*).

Video Summary Applications

'Manga' represents a single video as a storyboard using key frames extracted from the video (see Boreczky, J., Girgensohn, A., Golovchinsky, G. and Uchihashi, S. (2000), "An interactive comic book presentation for exploring video", *Proc. CHI* '00, ACM Press, pp. 185-192). These frames are analyzed and assigned an importance score, and more important key frames are displayed larger in the storyboard. Users can click on a key frame with the right mouse button to drill down. However, drill down in 'Manga' is limited to only one level. Further, the drill down function is limited to a keyframe either within the video segment or in its immediate neighborhood.

Information Visualization and Management Applications

Grokker™ software (Grokker http://www.grokker.com, last visited Oct. 12, 2005) generates information maps with nested circles representing clusters and categories, and rectangles representing the documents at the leaf nodes. Images are shown as rectangular thumbnails inside circles. This software does not allow for efficient layouts due to the empty spaces.

'CollageMachine' generates collages from Web pages. Random sites are selected as starting points, and the collage is automatically updated over time (see Keme, A. (2001) "*CollageMachine: A Model of Interface Ecolog*", NYU Ph.D. Dissertation, 2001). 'CollageMachine' ventures out along links to get images. Images displayed with 'CollageMachine' are not cropped and can overlap.

Thumbnail cropping has previously been described by Suh et al. and Wang et al. Suh, B., Ling, H., Bederson, B., Jacobs, D. (2003). Automatic thumbnail cropping and its effectiveness. *Proceedings of UIST* '03, pp. 95-104 and Wang, M., Xie, X., Ma, W., Zhang, H. (2003). MobiPicture—Browsing Pictures on Mobile Devices, *ACM Multimedia* '04 *Demo*. The method used to generate the k-tree resembles a mechanism for formatting elements in Web pages called Cascading Style Sheets, W3C (http://www.w3.org/Style/CSS, last visited Oct. 12, 2005). In a related application, a general framework of automatically generating collages from video, called FXPAL 'StainedGlass' collage, is described (FXPL-01093US0 and FXPL-01094US0). Further, images can be made into a collage using the FXPAL 'StainedGlass' collage technology (FXPL-01104US0 and FXPL-01107US0).

SUMMARY OF THE INVENTION

In this invention, we define algorithms to make effective use of display space for showing image search results. The overall solution is intuitive, scalable and space efficient.

For the image search results under consideration, each image has low level image features such as color or texture, and associated text metadata. The images may be ranked, where 'ranking' is the ordering of the images based on the output of a search engine algorithm. An 'equivalence class' is made up of a number of images with similar properties as determined based on text analysis of linguistic or high level features. 'Categorization' is used to determine which images belong to the same equivalence classes, based on similarity analysis of text metadata features such as labels or captions. A 'representative image' is an image, which is chosen from the images in an equivalence class based on the highest ranked image; or alternatively the image nearest to the centroid of the equivalence class, where the 'centroid of an equivalence class' is based on similarity analysis of features of all images in the equivalence class.

A 'cluster' is made up of a number of objects with similar properties. In an embodiment of the invention, where the objects of the cluster are images, the similar properties in 'clusters' are determined based on low level image features. In the case where the images of the cluster are equivalence classes, the similar properties are determined based on the low level image features of the representative images of the equivalence classes. When the number of objects present in a cluster is more than 'k', the k-means algorithm can be applied to the cluster so that the number of objects becomes 'k' or less. A 'centroid of a cluster' is based on analysis of similar properties of the objects in the cluster.

A 'k-tree' is a tree in which each node has k or less objects, where the objects may be images or equivalence classes. The 'root' of a tree is the topmost node. In an embodiment of the invention, the k-tree is obtained by iteratively applying the k-means algorithm. Starting from the root node, a node can be regarded as a 'parent', and each iteration of the k-means algorithm produces the next generation of 'offspring' nodes. 'Depth' describes the number of offspring generations to the root.

In an embodiment of the invention, each cluster is visualized as a 'StainedGlass' collage that condenses a 'k-set of images' down to their ROI and generates a collage without empty spaces. A 'k-set of images' is a set of offspring from the same parent node, which generically has exactly k elements, but in exceptional cases may have fewer than k elements. In an embodiment of the invention, those regions with offspring have expansion icons that allow the user to navigate down through the k-tree. In an embodiment of the invention, the search ranking order is preserved within each k-set and through each parent-offspring lineage, and the rank can be used to control the amount of cropping and scale factor for each image. In an embodiment of the invention, text categorization and relevance analysis are used to produce better clusters.

BRIEF DESCRIPTION OF THE DRAWINGS

Preferred embodiments of the present invention will be described in detail based on the following figures, wherein.

DETAILED DESCRIPTION

Figure 2:
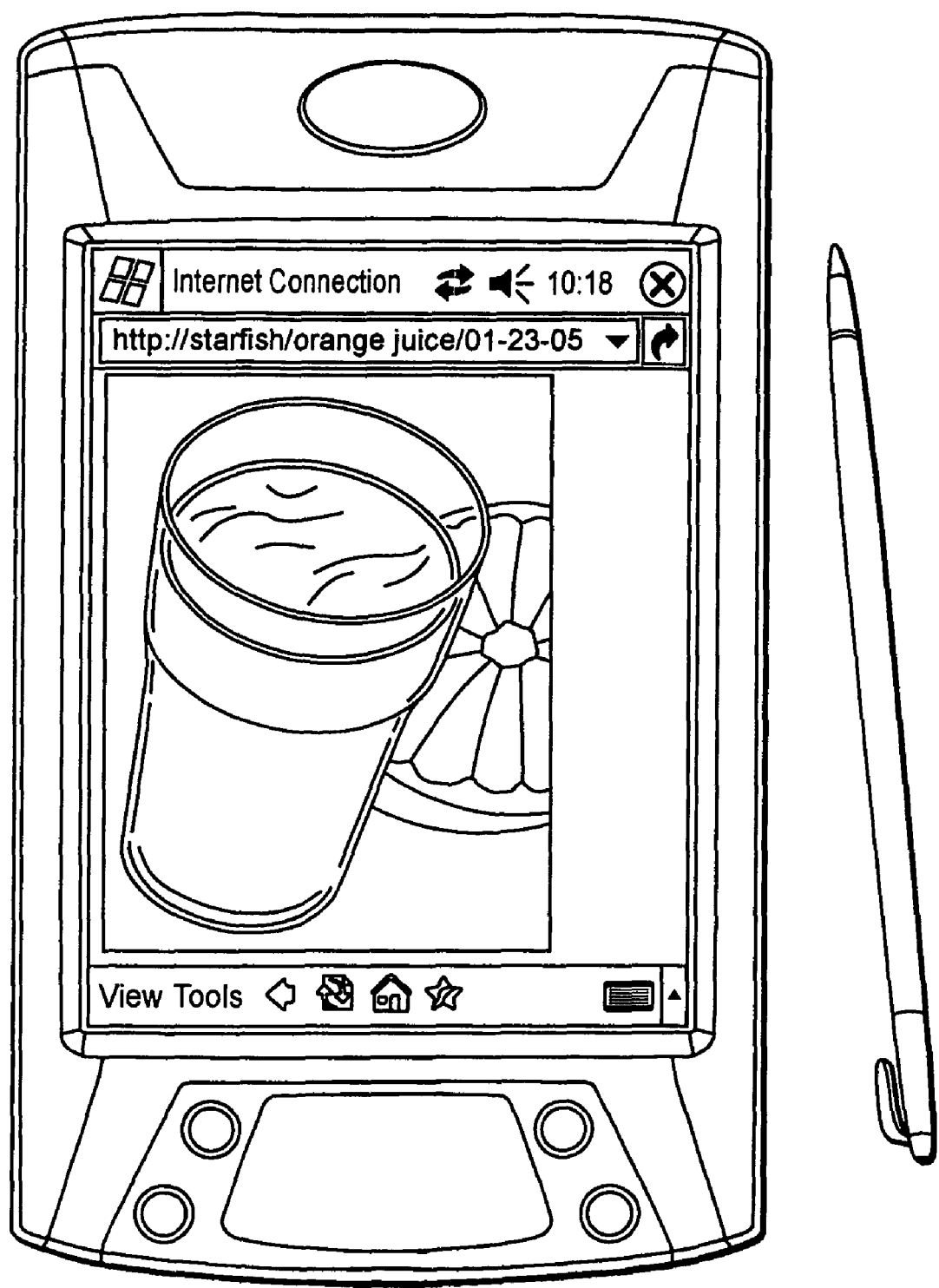
FIG. 2 shows an artists impression of a screenshot on a PDA of a glass of freshly squeezed orange juice and half of an orange.

This invention enables a user to be able to search for and show retrieved images on portable display devices, at any time and in any place. The invention is particularly helpful for travelers visiting foreign countries when facing language barriers, because images can communicate independent of language. For example, a person who wants to have a glass of freshly squeezed orange juice can simply search for "orange juice" on his PDA or cell phone and show an image that conveys freshly squeezed orange juice to the waiter at the restaurant as shown in FIG. 2. Another real life example is a "fly swatter", which is not easy to describe or pantomime. One can easily imagine many such uses in everyday situations.

In addition, there are also many domain specific applications. An example relevant to a hi-tech manufacturing company is when a service engineer is out in the field servicing an instrument and needs to find information about replacement parts. Having access to image search results allows the engineer to match the broken item in plain view with the item displayed over the Web.

In one embodiment of the invention, the method is aimed at retrieving and displaying search results from general sets of images like those from the Web. The search results can come from any image search engine, such as Google™, MSN Search, etc. These images are heterogeneous, having different sizes and aspect ratios. In addition, text is often found along with the images, or alternatively, metadata, nearby text, accessibility tags (e.g. HTML <alt> tag), etc may be present. Categorization and relevance analysis can be performed on the text through a language processor such as 'WordNet' or PARC 'XLE'.

Figure 1:
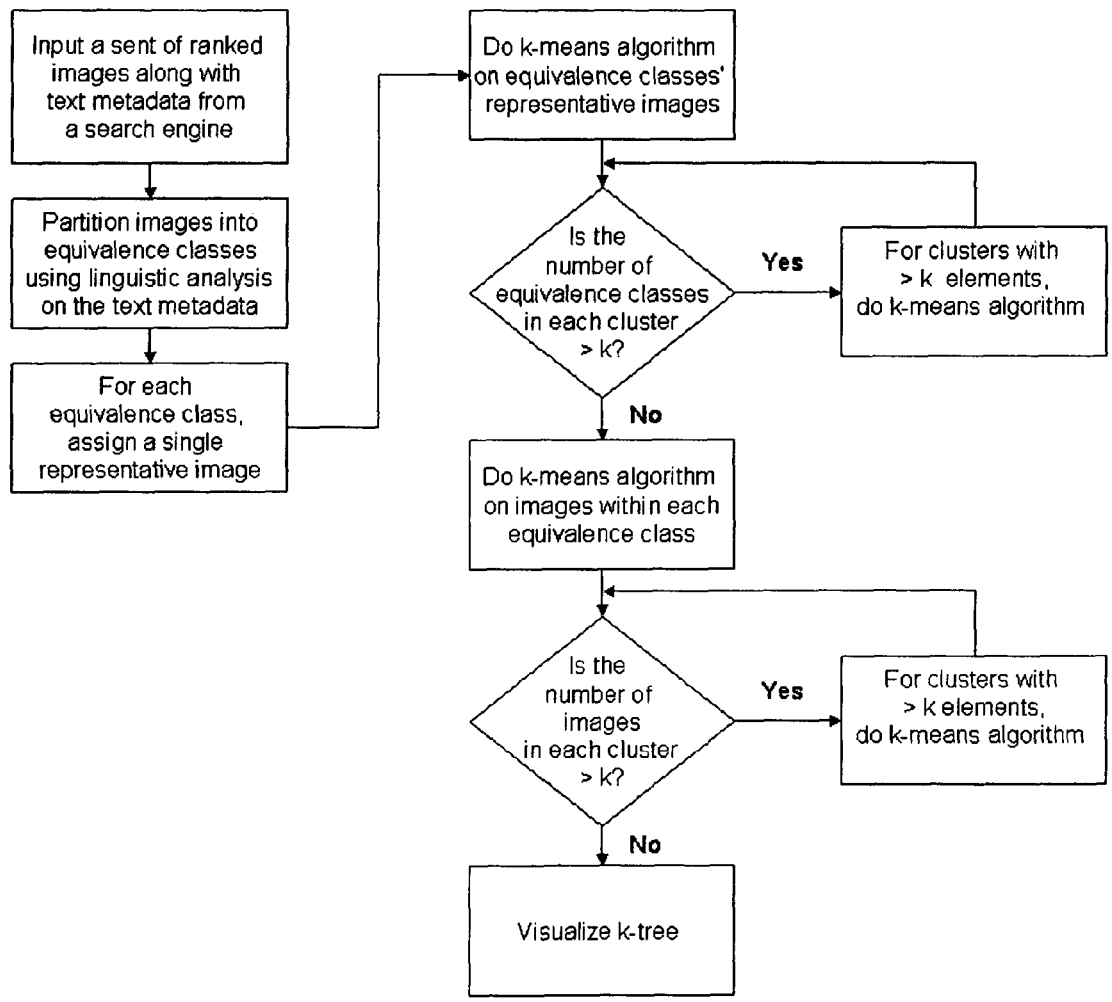
FIG. 1 shows a block diagram of an event flowchart for summarizing multiple images for display in accordance with the present invention.
Figure 3A:
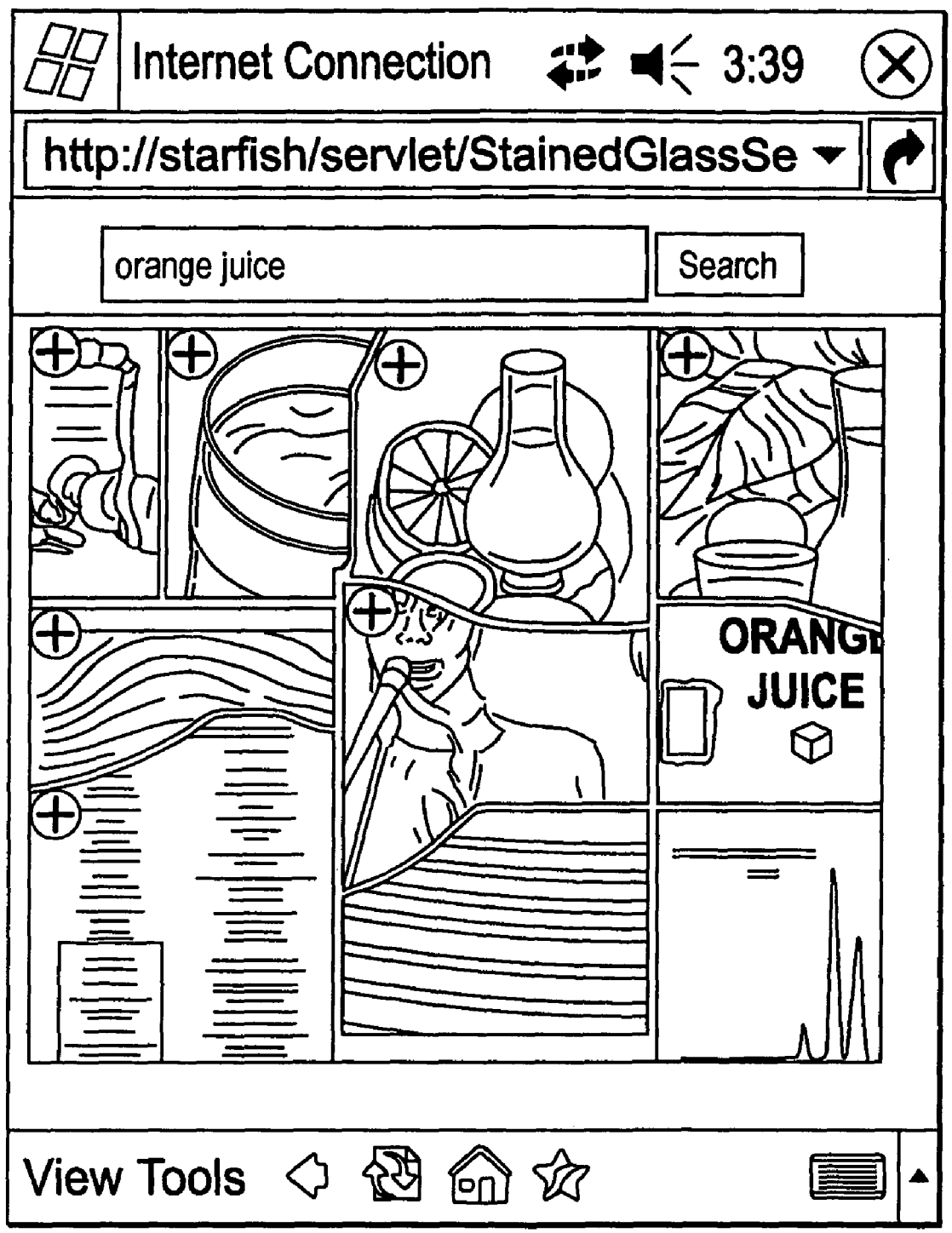
FIG. 3 shows an artists impression of (A) a screenshot displaying a 'StainedGlass' collage of regions of interest of images and (B) the corresponding whole images whose regions of interest make up the collage in FIG. 3 (A)
Figure 3B:
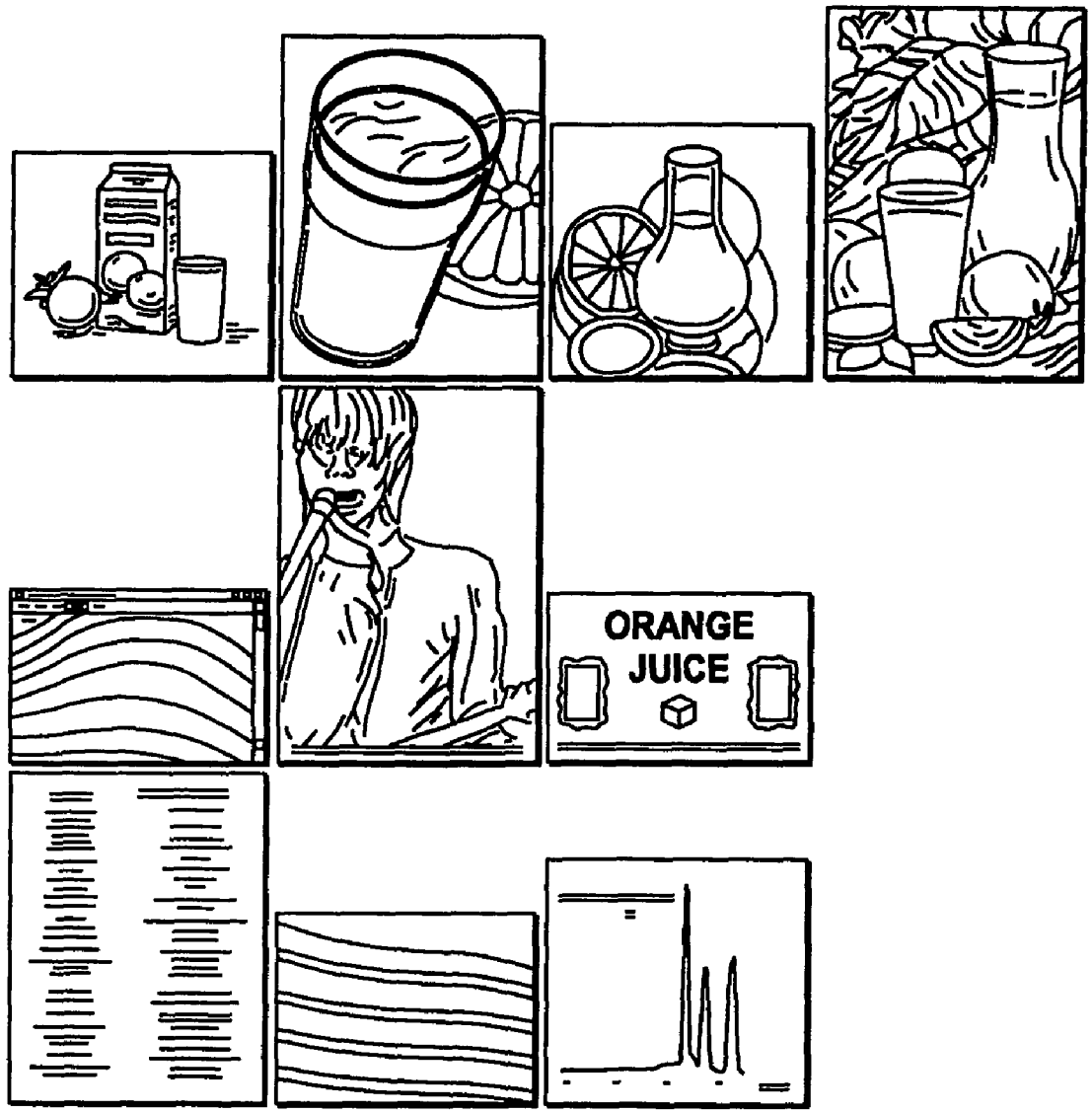

In various embodiments of the invention, we address additional problems such as the effective use of screen space, organization of the search results, and scalability to large sets. In one embodiment of the invention, the approach is to organize and structure the search results into a k-tree, and then visualize this on a small display. In FIG. 1, a block diagram of an event flowchart for summarizing multiple images in accordance with one embodiment of the invention. Essentially, along the depth of the tree, we collapse the offspring of a node and represent them by expansion icons. Along the breath of a tree node, we condense the images into a 'StainedGlass' collage as shown in FIG. 3(A). FIG. 3(B) show the images from which the collage shown in FIG. 3(A) were assembled.

Technical Details

Computing a k-Tree Using the k-Means Algorithm

In an embodiment of the invention, a k-means algorithm is used to cluster images. In an embodiment of the invention, this can be multi-modal as it can take into account the text or metadata similarity score.

Figure 5:
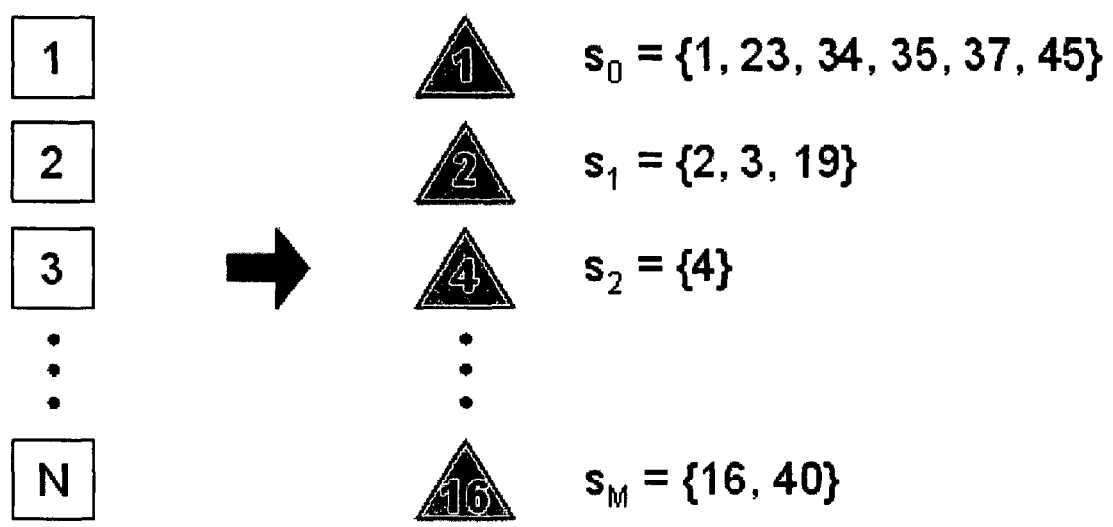
FIG. 5 shows schematically how ranked images are partitioned into equivalence classes (1, 2 3, . . . N), where the highest ranked image ($s_0, s_1, s_2, \ldots s_M$) is selected as the representative image (denoted by $\Delta$)

In an embodiment of the invention, the preliminary step is to use the text or metadata similarity score to categorize the N images into M+1 equivalence classes. We do not assume some pre-determined categorization or ontology; we only assume that we have a function that can give a similarity score for two text strings. We categorize images into the same equivalence class only if they have high similarity scores among them. The result is a large number of sets, which form a partition of the ranked images into M+1 equivalence classes as shown schematically in FIG. 5. From each equivalence class we choose a representative image by taking its highest ranked image. Alternatively, in an embodiment of the invention in which the images are not ranked we can take the image closest to the centroid of the equivalence class to be the representative image.

The k-means algorithm is much more efficient if the objects can be embedded in Euclidean space. In an embodiment of the invention, images are embedded mapping their color histograms of L bins into L-dimensional Euclidean space, i.e., the values of the L bins are mapped to a vector of L coordinates, and the distance is Euclidean distance. In practice, this leads to reasonable results since having 'close in distance' histograms is an indication of image similarity.

In an embodiment of the invention, the k-means algorithm has three steps: (1) initialization, (2) compute centroids for each cluster, (3) assignment of each representative image to a cluster with nearest centroid. In an embodiment of the invention, steps (2) and (3) are iterated until it converges (i.e., the cluster members do not change with one or more iterations) or a stopping condition is met (e.g. a limit on number of iterations such as 1,000). Initialization can be performed by arbitrarily assigning the objects into k clusters; a better way is to use a hierarchical agglomerative algorithm to put the objects into k clusters.

Figure 6:
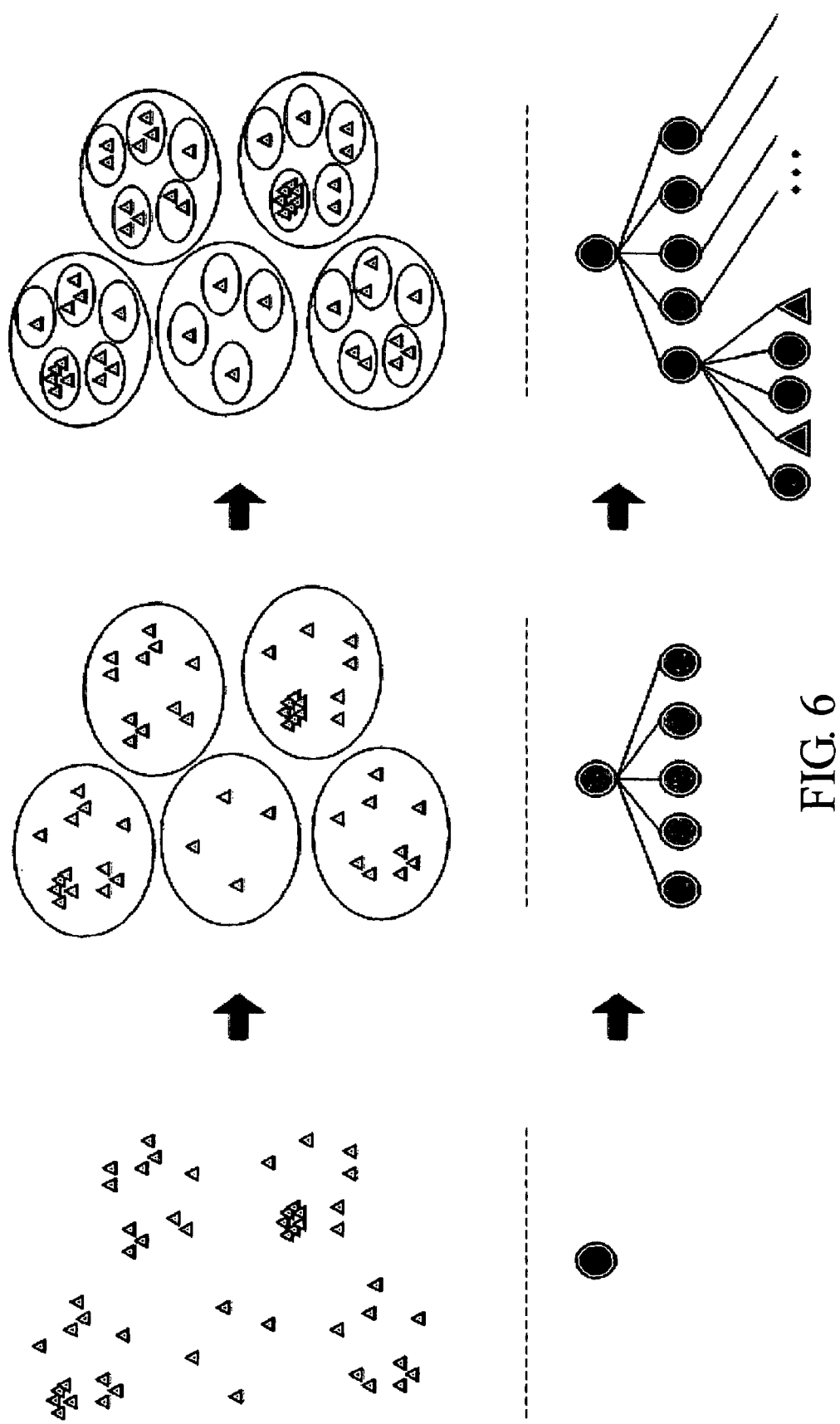
FIG. 6 shows schematically the first two iterations of how the representative images (denoted by $\Delta$) from equivalence classes are categorized recursively (denoted by $\Delta$'s within a circle or $\Delta$'s within a circle within a circle) and below the dashed line each iterations corresponding k-tree (for k=5)

In an embodiment of the invention, the procedure to cluster a set into k clusters is applied recursively on each successive generation of clusters to obtain a k-tree. Each node of this k-tree will have exactly k offspring except for the nodes containing leaves, which may have fewer than k offspring. Initially, the k-means clustering is performed on the one or more equivalence classes from the preliminary step by analysis of their representative images. For each equivalence class there is assigned exactly one representative image. This part of the procedure is shown in FIG. 6, where the triangles represent the equivalence classes.

Figure 7:
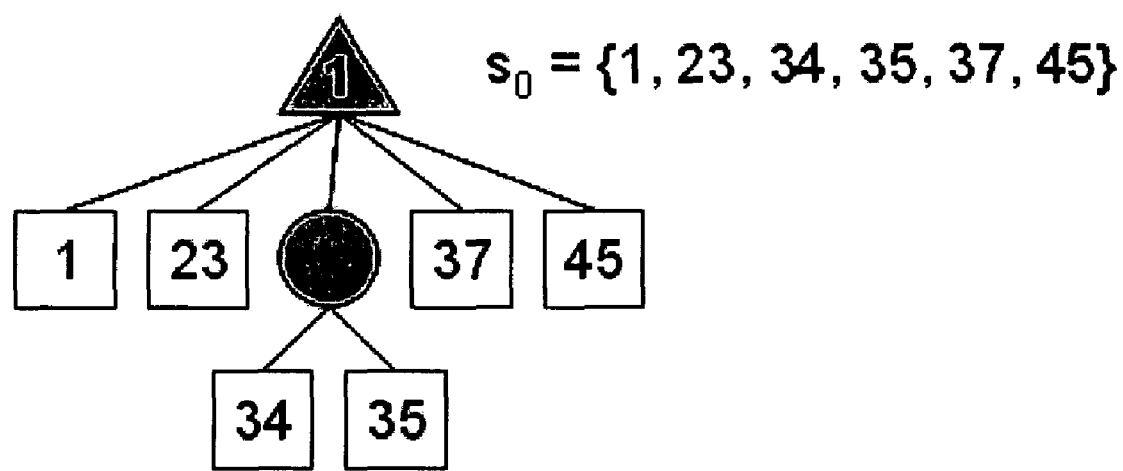
FIG. 7 shows schematically how each equivalence class so is recursively clustered into a k-tree.

In an embodiment of the invention, in order to produce a tree whose leaf nodes are all images, the same k-means algorithm is applied to cluster the images within all equivalence classes as shown in FIG. 7.

Visualizing the k-Tree of Ranked Images

In an embodiment of the invention, the display shows a set of images from a single node of the k-tree with links to its offspring nodes and direct links to their representative images. For each node, its offspring node' representative images are made into StainedGlass collages. This condenses the images into irregular-shaped regions that are laid out for efficient display on a small screen. An example of a StainedGlass collage and the corresponding original images is displayed in FIG. 3.

StainedGlass collages are more flexible than simpler rectangular layouts. The simplest layout is to scale down the images and put them row-by-row, going from left to right. However, this wastes a large amount of space because the images may have different aspect ratios as shown in FIG. 3(B). In an embodiment of the invention, more sophisticated cropping can be employed to fit an image's ROI into a rectangular area, and these cropped thumbnails can be laid out in a grid on the display.

The drawback of rectangular grid layouts is that space-filling tessellations with exactly k equal-sized rectangles do not always match the screen's aspect ratio. For example, showing ten images at a time has advantages. It is a common cultural practice to show the "Top Ten" items, or to show ten objects at a time to facilitate counting. On cell phones, it makes sense to display ten images so that the ten numbered buttons on the keypad can be used to access the images. However, with uniform rectangular thumbnails, the space-filling grids (1×10 and 2×5) do not match well to the aspect ratio of standard displays. On the other hand, StainedGlass collages can lay out exactly ten (or any number of) images on a screen having almost any aspect ratio.

In an embodiment of the invention, clicking on an image region of the collage shows that entire image. The image shown in the screenshot in FIG. 2, also exemplifies the image that would result from selecting the '+' or 'plus operator symbol' icon in the second image (i.e., next to the top left image) in FIG. 3(A).

Figure 4:
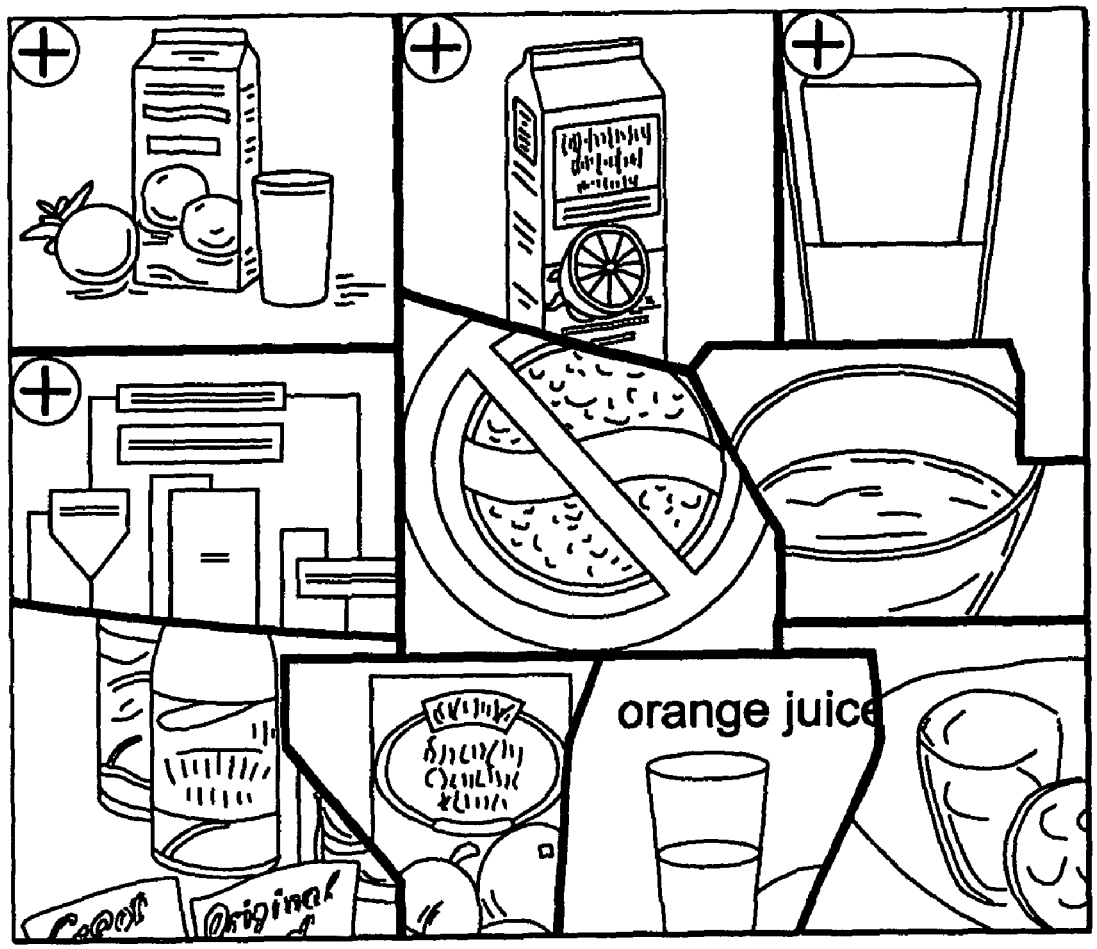
FIG. 4 shows an artists impression of the collage displayed where the '+' or 'plus operator symbol' icon in the top left corner of the collage in FIG. 3 (A) is selected.

In an embodiment of the invention, each region has an expansion icon (labeled by a '+' or 'plus operator symbol'). Clicking on this icon displays the collage for that region's node. For example, FIG. 4, which illustrates the resulting collage obtained by clicking on the top left region in FIG. 3(A); it consists of the representative images of its offspring.

In an embodiment of the invention, the rank order is maintained in the visualization. Starting from the top left, the rank descends from left to right along rows. The ordered images are laid out like a paragraph of words in English.

In an embodiment of the invention, the rank is also maintained as the user navigates down the tree. This means that the top ranked image of a node will always be at the top ranked spot at the top left position no matter what level of the tree is displayed (see FIGS. 3 and 4).

Cascading Cluster Collages

In an embodiment of the invention, the method can be generalized to work with search results in which some of the labeled images can be structured into a category tree or ontology. Web standards exist for this kind of structure using metadata in XML such as RDF, XML-Schema, and MPEG-7. Hence, our method is highly compatible with the way data is structured on the Web and can reflect that structure when it is provided by the author of the Web pages (for example using tags on web pages).

In an embodiment of the invention, when an image is not labeled by some formally defined metadata, the method attempts to find some structure by looking at the text on that image's Website in relation to the text labels of other images. A category tree can sometimes be inferred via linguistic processing with a lexical database (e.g. WordNet, http://wordnet.princeton.edu, last visited Oct. 12, 2005) to analyze the surrounding text on the image's Web page (e.g. orange—fruit—plant, orange—color).

In an embodiment of the invention, the visualization can show whether a set of images belong to the same category by varying the color or other visual attribute (e.g. thickness) of the borders between the images in the collage. For example, when there is no category relation, the borders can be black as shown in FIG. 8; and when there is a category relation, the borders can be gray as shown in FIG. 9.

By cascading, we mean that more than one type of features are used for the process of clustering and categorizing to generate the k-tree, and this process is performed in a series. In an embodiment of the invention, the process flows from the most general features to the most specific. In a further embodiment of the invention, at the most general level, without text data or semantic information about the images, the images are clustered by the low level data that represent the image. In one embodiment of the invention, this could be the RGB value of the pixels in an image. In another embodiment of the invention, the color histogram of an image is used since in practice this is much more efficient. In another embodiment of the invention, when the metadata labels can be inferred or are provided, they are used for categorizing and override the low level features. The more specific an image's label in the category tree, the less exposed that image is to the process which moves from the general to the specific. Thus this is an intuitive way to generate the k-tree.

Figure 8A:
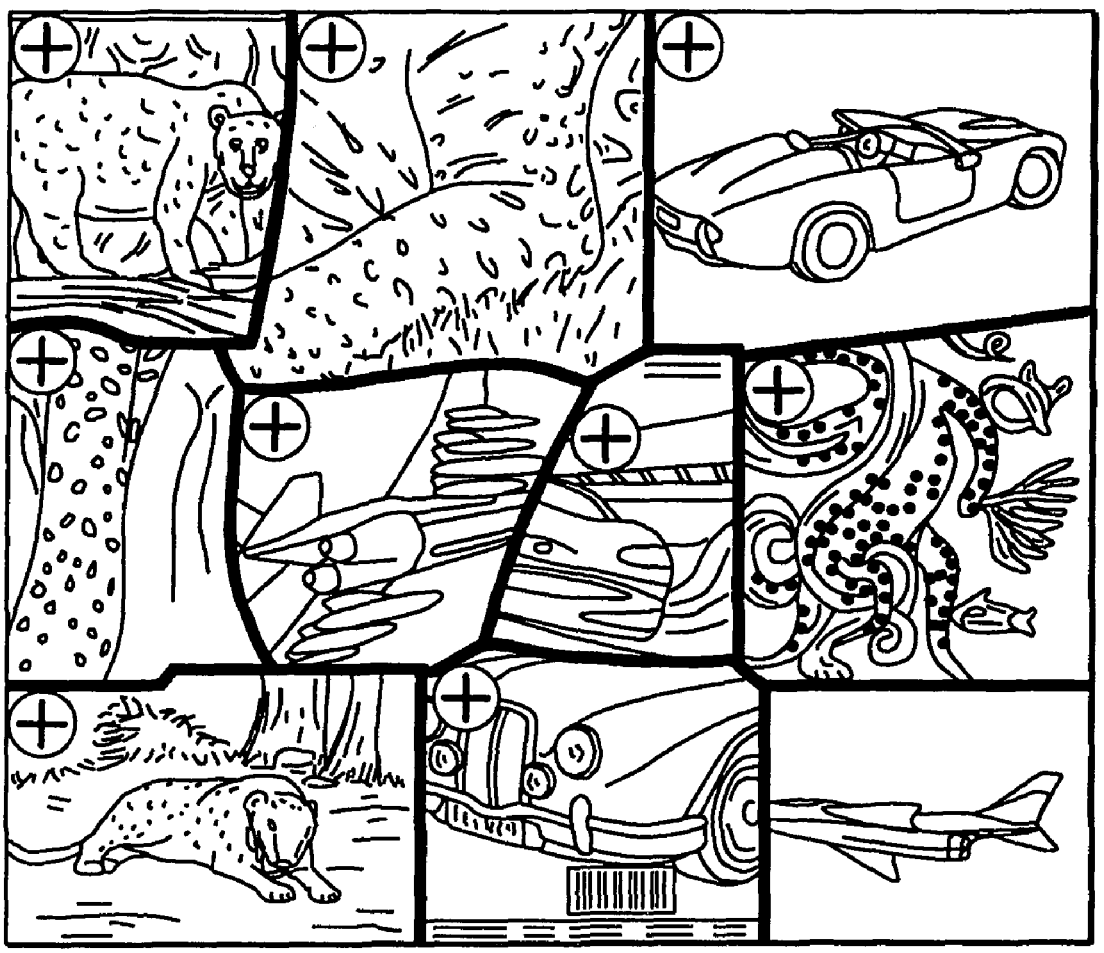
FIG. 8 shows an artists impression of 'StainedGlass' collages of "jaguar" where (A) the image labels are not used (p=0), (B) image labels are partially used (p=0.75) and (C) image labels are fully used (p=1.0)
Figure 8B:
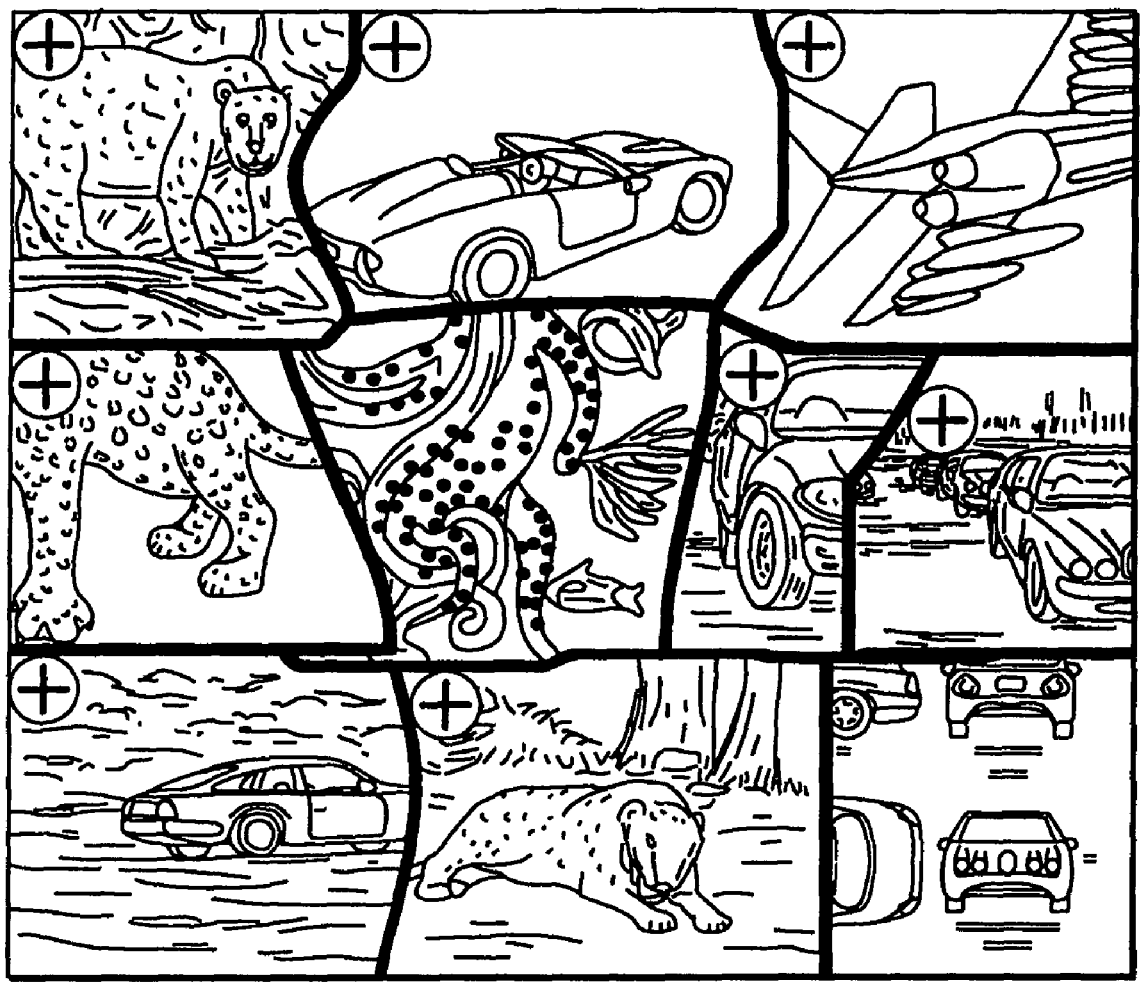
Figure 8C:
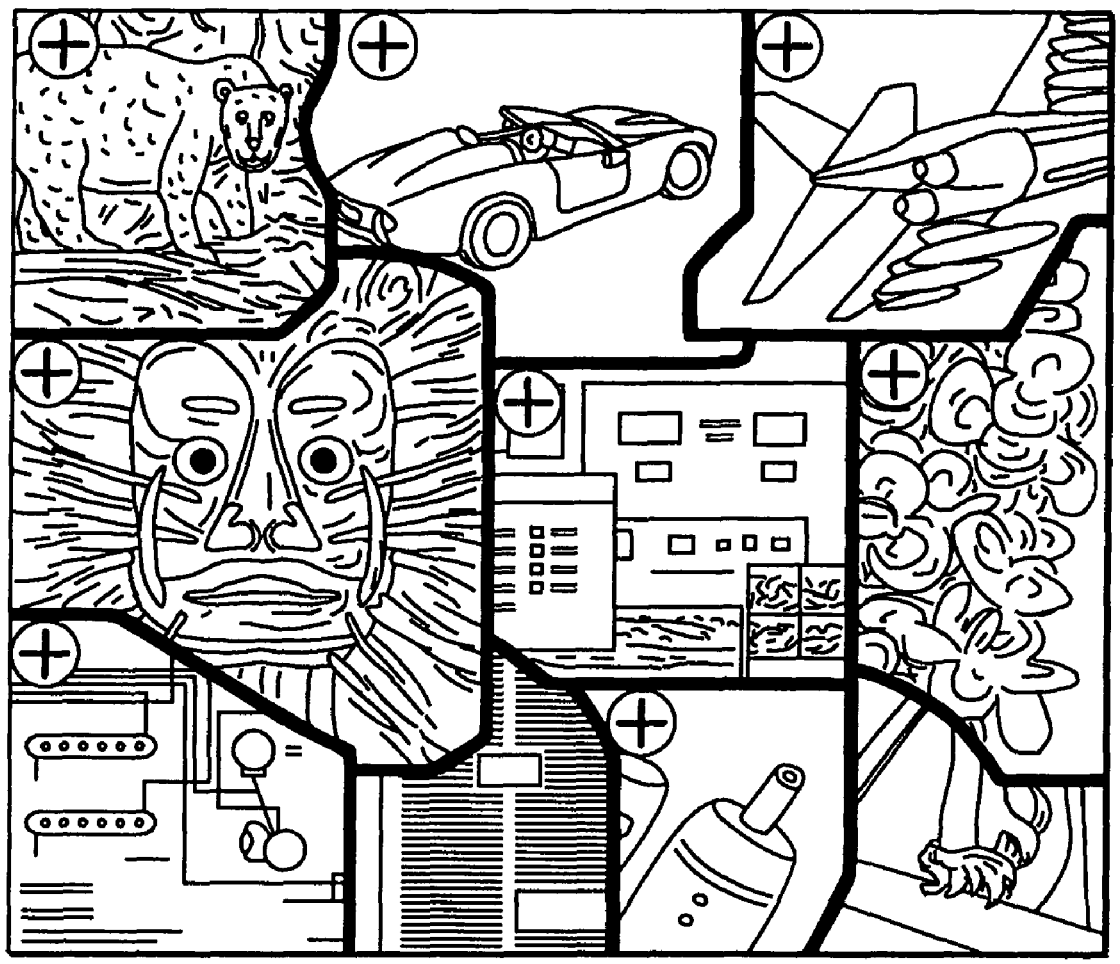
Figure 9:
FIG. 9 shows an artists impression of a 'StainedGlass' collage of "jaguar" where grey borders are used between images within the same equivalence class.

An example is shown in FIGS. 8 and 9, where the query term used was "jaguar", and a ranked list of 100 images was obtained from Google™. The set of images were hand-labeled, where 77 images were categorized into clearly discernable categories: car, cat, OS, and plane. The rest were left unlabeled. FIG. 8(A), illustrates the top-level collage when the label information is not used. In FIG. 8(B), we simulated the partially labeled case by randomly using the image's label with a probability of 0.75, which is a rough estimate of what can be achieved computationally (see Ide, N., and Veronis, J. (1998) "Introduction to the special issue on word sense disambiguation: the state of the art" *Computational Linguistics*, 24(1), 1-40). In FIG. 8(C), the labeled information is fully used. Table 1 summarizes the results.

TABLE 1

K-tree of collages for "jaguar" example.

| LABELS | DEPTH | # OF COLLAGES |
|---|---|---|
| FIG. 8(A) Not used (0.0) | 3 | 19 |
| FIG. 8(B) Partially used (0.75) | 4 | 26 |
| FIG. 8(C) Fully used (1.0) | 4 | 17 |

Examining these top-level collages, we see that the collage obtained using labeled information (as shown in FIG. 8(C) is the best in terms of recall of the categories, finding 100% (4/4). The other two examples had the same recall of 75% (3/4). However, the partially labeled case performs better than the no label case because it is less redundant (note that the first two images in the collage in FIG. 8(B) are from different categories).

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

A method of summarizing a plurality of ranked images to enable the images to be displayed on a display device comprising the steps of categorizing the images into one or more equivalence classes. Selecting a representative image for each of the one or more equivalence classes. Computing a k-means algorithm on each of the one or more representative images to produce a first plurality of clusters until a predetermined first criteria is met. Computing a k-means algorithm on each of the images in the one or more equivalence classes to produce a second plurality of clusters until a predetermined second criteria is met. Displaying a k-tree of images, wherein the images are displayed using a StainedGlass collage technique, wherein the depth of the k-tree of images can be accessed through expander icons in the StainedGlass collage.

A system or apparatus for displaying a k-tree of images from a plurality of ranked images wherein displaying the k-tree comprising one or more processors capable of specifying one or more sets of parameters; capable of transferring the one or more sets of parameters to a source code; capable of compiling the source code into a series of tasks for displaying the k-tree of images. A machine readable medium including operations stored thereon that when processed by one or more processors cause a system to perform the steps of specifying one or more sets of parameters; transferring one or more sets of parameters to a source code; compiling the source code into a series of tasks for displaying the k-tree of images.

What is claimed is:

1. A method of summarizing and displaying a plurality of ranked images to enable the images to be displayed on a display device comprising the steps of:
   (a) categorizing the images into one or more equivalence classes;
   (b) selecting a representative image for each of the one or more equivalence classes;
   (c) computing a k-means algorithm on each of the one or more representative images to produce a first plurality of clusters;
   (d) repeating step (c) until a predetermined first criteria is met;
   (e) computing a k-means algorithm on each of the images in the one or more equivalence classes to produce a second plurality of clusters;
   (f) repeating step (e) until a predetermined second criteria is met;
   (g) assigning the plurality of representative images to one of a plurality of clusters;
   (h) computing the centroid of each of the plurality of clusters;
   (i) assigning the plurality of representative images to the cluster with the nearest centroid;
   (j) repeating steps (h) and (i) until a predetermined third criteria is met;
   (k) displaying a k-tree of images, wherein the images are displayed using a StainedGlass collage technique, wherein the StainedGlass collage displays the breadth of the k-tree; and
   (l) displaying a relationship between two or more of the images which share at least one border using an attribute selected from the group consisting of the border type, the border color and the border thickness, wherein the relationship includes whether the images belong to a same or different equivalence class, and wherein the selected attribute is displayed differently for different relationships between the two or more images.

2. The method of claim 1, where in step (b) the representative image is selected based on a criterion selected from the group consisting of ranking and centroid of equivalence class.

3. The method of claim 1, where in step (a) the images are categorized across clusters using one or more metadata labels.

4. The method of claim 3, where the images are categorized based on a similarity analysis of the metadata labels.

5. The method of claim 3, where the images are categorized based on linguistic analysis.

6. The method of claim 1, where the first and second criteria are that no cluster contains more than k images.

7. The method of claim 1, where in step (d) the centroids of the clusters are determined based on one or more low level features of the representative images assigned to that cluster; where the low level features are selected from the group consisting of black and white versus color, color histograms, file size, image size, name, type of file and Uniform Resource Locator.

8. The method of claim 7, where the centroids of clusters containing representative color images is based on the relative Euclidean distance; where the color histograms of the representative images are embedded into Euclidean space to determine the Euclidean distance.

9. The method of claim 7, where the centroids of the clusters are determined based on a similarity analysis of the low level features.

10. The method of claim 1, wherein the images can be interactively accessed.

11. The method of claim 1, wherein the depth of the k-tree of images can be accessed through expander icons in the StainedGlass collage.

12. The method of claim 1, wherein the third criteria is selected from the group consisting of convergence and a stopping condition.

13. A method of summarizing and displaying a plurality of ranked images to enable the images to be displayed on a display device comprising the steps of:
   (a) categorizing the images into one or more equivalence classes;
   (b) selecting a representative image for each of the one or more equivalence classes;
   (c) computing a k-means algorithm on each of the one or more representative images to produce a first plurality of clusters;

(d) repeating step (c) until a predetermined first criteria is met;

(e) computing a k-means algorithm on each of the images in the one or more equivalence classes to produce a second plurality of clusters;

(f) repeating step (e) until a predetermined second criteria is met;

(g) assigning the plurality of representative images to one of a plurality of clusters;

(h) computing the centroid of each of the plurality of clusters;

(i) assigning the plurality of representative images to the cluster with the nearest centroid;

(j) repeating steps (h) and (i) until a predetermined third criteria is met; and (k) displaying the k-tree of images, wherein the images are displayed using a StainedGlass collage technique, wherein the images can be interactively accessed, wherein a relationship between two or more of the images which share at least one border is displayed using an attribute selected from the group consisting of the border type, the border color and the border thickness, wherein the relationship includes whether the images belong to a same or different equivalence class, and wherein the selected attribute is displayed differently for different relationships between the two or more.

14. The method of claim 13, wherein the StainedGlass collage displays the breadth of the k-tree.

15. The method of claim 13, wherein the depth of the k-tree of images can be accessed through expander icons in the StainedGlass collage.

16. A method of summarizing and displaying a plurality of ranked images to enable the images to be displayed on a display device comprising the steps of:

(a) categorizing the images into one or more equivalence classes;

(b) selecting a representative image for each of the one or more equivalence classes;

(c) computing a k-means algorithm on each of the one or more representative images to produce a first plurality of clusters;

(d) repeating step (c) until a predetermined first criteria is met;

(e) computing a k-means algorithm on each of the images in the one or more equivalence classes to produce a second plurality of clusters;

(f) repeating step (e) until a predetermined second criteria is met;

(g) assigning the plurality of representative images to one of a plurality of clusters;

(h) computing the centroid of each of the plurality of clusters;

(i) assigning the plurality of representative images to the cluster with the nearest centroid;

(j) repeating steps (h) and (i) until a predetermined third criteria is met; and (k) displaying the k-tree of images, wherein the images are displayed using a StainedGlass collage technique, wherein a relationship between two or more of the images which share at least one border is displayed using an attribute selected from the group consisting of the border type, the border color and the border thickness, wherein the relationship includes whether the images belong to a same or different equivalence class, and wherein the selected attribute is displayed differently for different relationships between the two or more images.

17. The method of claim 16, wherein the StainedGlass collage displays the breadth of the k-tree.

18. The method of claim 16, wherein the images can be interactively accessed.

19. The method of claim 16, wherein the depth of the k-tree of images can be accessed through expander icons in the StainedGlass collage.

20. A machine-readable medium having instructions stored thereon to cause a system to:

(a) categorize the images into one or more equivalence classes;

(b) select a representative image for each of the one or more equivalence classes;

(c) compute a k-means algorithm on each of the one or more representative images to produce a first plurality of clusters;

(d) repeat step (c) until a predetermined first criteria is met;

(e) compute a k-means algorithm on each of the images in the one or more equivalence classes to produce a second plurality of clusters;

(f) repeat step (e) until a predetermined second criteria is met;

(g) assign the plurality of representative images to one of a plurality of clusters;

(h) compute the centroid of each of the plurality of clusters;

(i) assign the plurality of representative images to the cluster with the nearest centroid;

(j) repeat steps (h) and (i) until a predetermined third criteria is met; and (k) display the k-tree of images, wherein the images are displayed using a StainedGlass collage technique, wherein the depth of the k-tree of images can be accessed through expander icons in the StainedGlass collage, wherein a relationship between two or more of the images which share at least one border is displayed using an attribute selected from the group consisting of the border type, the border color and the border thickness, wherein the relationship includes whether the images belong to a same or different equivalence class, and wherein the selected attribute is displayed differently for different relationships between the two or more images.

* * * * *